US009290081B2

(12) United States Patent
Randleman et al.

(10) Patent No.: US 9,290,081 B2
(45) Date of Patent: Mar. 22, 2016

(54) VENTILATION CAP (71) Applicant: Caterpillar Inc., Peoria, IL (US)

(72) Inventors: Sean Alan Randleman, Peoria, IL (US); Daniel Kurtis Allen, Princeville, IL (US); Timothy Johann Lindner, Morton, IL (US); Joseph Jeffrey Every, Peoria, IL (US); Michael Steven Koch, Tremont, IL (US)

(73) Assignee: Caterpillar Inc., Peoria, IL (US)

( * ) Notice: Subject to any disclaimer, the term of this patent is extended or adjusted under 35 U.S.C. 154(b) by 752 days.

(21) Appl. No.: 13/644,120

(22) Filed: Oct. 3, 2012

(65) Prior Publication Data

US 2014/0094107 A1    Apr. 3, 2014

(51) Int. Cl.
*F24F 7/00* (2006.01)
*F23J 11/04* (2006.01)
*F23J 13/08* (2006.01)
*F23L 17/02* (2006.01)
*B60H 1/26* (2006.01)
*B62D 25/06* (2006.01)
*B62D 25/24* (2006.01)
*B62D 33/06* (2006.01)
*B60H 1/00* (2006.01)
*B60H 1/30* (2006.01)

(52) U.S. Cl.
CPC ............ *B60H 1/262* (2013.01); *B60H 1/00378* (2013.01); *B60H 1/30* (2013.01); *B62D 25/06* (2013.01); *B62D 25/24* (2013.01); *B62D 33/0617* (2013.01)

(58) Field of Classification Search
USPC .................................... 454/275, 158, 2–4, 33
IPC ....... B60H 1/262,1/00378, 1/30; B62D 33/0617
See application file for complete search history.

(56) References Cited

U.S. PATENT DOCUMENTS

| 1,606,410 | A |   | 11/1926 | Frame |
| 2,672,088 | A | * | 3/1954  | Orr ......................... F24F 13/10 137/601.09 |
| 4,142,457 | A | * | 3/1979  | Zaniewski .............. F23L 17/02 454/38 |
| 4,325,290 | A |   | 4/1982  | Wolfert |
| 4,603,619 | A | * | 8/1986  | Amphoux ............. F01N 13/082 454/33 |
| 4,612,975 | A |   | 9/1986  | Ikari |
| 5,302,153 | A |   | 4/1994  | Winters |

(Continued)

FOREIGN PATENT DOCUMENTS

JP    55119516    9/1980
JP    08012286    1/1996

(Continued)

*Primary Examiner* — Steven B McAllister
*Assistant Examiner* — Helena Kosanovic
(74) *Attorney, Agent, or Firm* — D. Spillman (57) ABSTRACT A ventilation cap includes a tube portion, a vent portion, and an upper portion. The tube portion is configured to releasably engage with a vent pipe. The vent portion extends from the tube portion to define a common pathway formed therein. The vent portion has at least three interconnected adjacent sides. Each of the sides includes one or more upright ribs, and multiple contiguous ribs laterally extending from the upright ribs to define openings in fluid communication with the common pathway. The contiguous ribs at one or more sides have an intermediate segment with an increased cross-sectional area. The contiguous ribs taper laterally from the intermediate segment to ends. The upper portion is disposed above the vent portion and connected to an upper end of the upright ribs.

20 Claims, 9 Drawing Sheets

(56) References Cited

U.S. PATENT DOCUMENTS

| | | | |
|---|---|---|---|
| 5,672,101 A * | 9/1997 | Thomas | B60H 1/262 454/136 |
| 6,447,565 B1 | 9/2002 | Raszkowski et al. | |
| 2008/0314061 A1 | 12/2008 | Nagami et al. | |
| 2009/0047890 A1 | 2/2009 | Yano et al. | |
| 2012/0003911 A1 | 1/2012 | Geiss et al. | |

FOREIGN PATENT DOCUMENTS

| | | |
|---|---|---|
| JP | 2002219931 | 8/2002 |
| JP | 2004010231 | 1/2004 |

* cited by examiner

VENTILATION CAP

TECHNICAL FIELD

The present disclosure relates to a ventilation cap, and more particularly to a ventilation cap for a vent pipe of an automobile.

BACKGROUND

U.S Published Application 2009/0047890 discloses a vent member including a support body provided with a through-hole, a permeable membrane to close the through-hole, and a cover part to cover the permeable membrane. A ventilation hole is made in a ceiling portion of the cover part and a notch is made in a side wall portion thereof. The ventilation hole and notch act as a passage for ventilation between the interior and the exterior of the cover part. The ventilation hole does not overlap a permeable region of the permeable membrane in the axial direction. Further, the side wall portion extends below a position at which the permeable membrane is disposed. Therefore, the permeable membrane is protected along a circumferential direction by the side wall portion.

Conventional vent covers or vent members are mounted on vent pipes of machines to allow an exchange of gases between the machine and an atmosphere. These vent covers include multiple openings to allow the exchange of gases. However, these openings may be disposed facing substantially upward into the atmosphere. Hence, during operation of the machine in rainy or snowy conditions, liquid or solid matter, for example, water or ice, may be incident on the openings. In such conditions, the openings may inadvertently allow the liquid or solid matter to enter the machine and negatively impact the working of the machine.

SUMMARY OF THE DISCLOSURE

In one aspect, the present disclosure provides a ventilation cap including a tube portion, a vent portion, and an upper portion. The tube portion is configured to releasably engage with a vent pipe. The vent portion extends from the tube portion to define a common pathway formed therein. The vent portion has at least three interconnected adjacent sides. Each of the sides includes one or more upright ribs, and multiple contiguous ribs. The contiguous ribs laterally extend from the upright ribs to define openings in fluid communication with the common pathway. The contiguous ribs at one or more sides have an intermediate segment with an increased cross-sectional area. The contiguous ribs taper laterally from the intermediate segment to ends. The upper portion is disposed above the vent portion and connected to an upper end of the upright ribs.

In another aspect, the present disclosure discloses the ventilation cap including the tube portion, the vent portion, and the upper portion. The tube portion is configured to releasably engage with a vent pipe. The vent portion extends from the tube portion to define the common pathway formed therein. The vent portion has at least three interconnected adjacent sides. Each of the sides includes one or more upright ribs, and multiple contiguous ribs. The contiguous ribs laterally extend from the upright ribs to define openings in fluid communication with the common pathway. The contiguous ribs at one or more sides have an intermediate segment with an increased cross-sectional area. The contiguous ribs taper laterally from the intermediate segment to ends. The contiguous ribs further include an inner edge defining a parapet. The upper portion is disposed above the vent portion and connected to an upper end of the upright ribs.

Other features and aspects of this disclosure will be apparent from the following description and the accompanying drawings.

DETAILED DESCRIPTION

Figure 1:
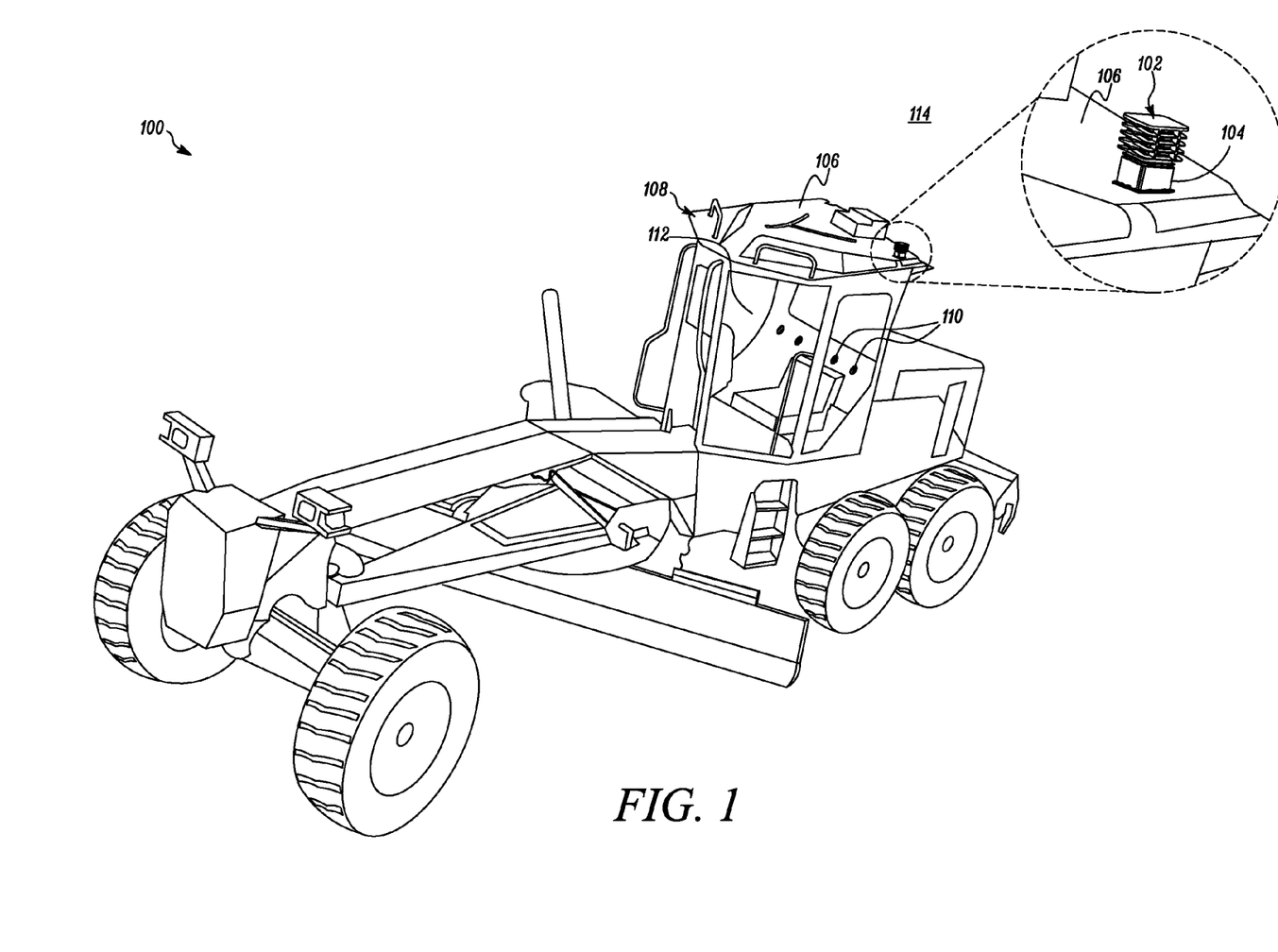
FIG. 1 is a perspective view of an exemplary automobile with a ventilation cap in accordance with an embodiment of the present disclosure.

The present disclosure relates to a ventilation cap for a vent pipe of an automobile. FIG. 1 shows a perspective view of an exemplary automobile 100 with a ventilation cap 102. The automobile 100 may be, for example, a motor grader, a tractor, a skid steer loader, a load haul dumper, and the like. As shown in FIG. 1, the automobile 100 may embody a motor grader 100 which may be used for producing flat lands. In an embodiment as shown in FIG. 1, the ventilation cap 102 may be used on a substantially upright vent pipe 104 positioned on a roof 106 of a cab 108 of the motor grader 100.

In a further embodiment, the vent pipe 104 may be associated with a heating, ventilation, and air-conditioning (HVAC) system of the automobile 100. Subsequently, the ventilation cap 102 may be used with the vent pipe 104 of the HVAC system. In another embodiment as shown in FIG. 1, the vent pipe 104 may be associated with a stand-alone ventilating system 110 of the machine. Hence in this embodiment, the ventilating cap may be used with the vent pipe 104 of the stand-alone ventilating system 110. The stand-alone ventilating system 110 disclosed in the preceding embodiment represents a ventilating system 110 that is configured to provide simple exchange of gases between an interior 112 of the automobile 100, for example, a cab 108 of the motor grader 100, and the atmosphere 114.

In an embodiment, the ventilation cap 102 may be obtained by an injection molding process of an elastomer, for example, a thermoplastic elastomer such as Santoprene™, or other materials. As shown in FIG. 1, the ventilation cap 102 is used in conjunction with the vent pipe 104 of the motor grader 100. This represents an outdoor application exposing the ventilation cap 102 to extreme conditions such as heat, rain, snow and the like. It is to be understood that the choice of materials used in the manufacture of the ventilation cap 102 may vary depending on a particular application and the operating conditions associated with that application. Hence, although it is disclosed herein that the ventilation cap 102 is made of a thermoplastic elastomer such as Santoprene™, a person having ordinary skill in the art will acknowledge that the ventilation cap 102 may be manufactured by using other materials commonly known in the art.

Figure 2:
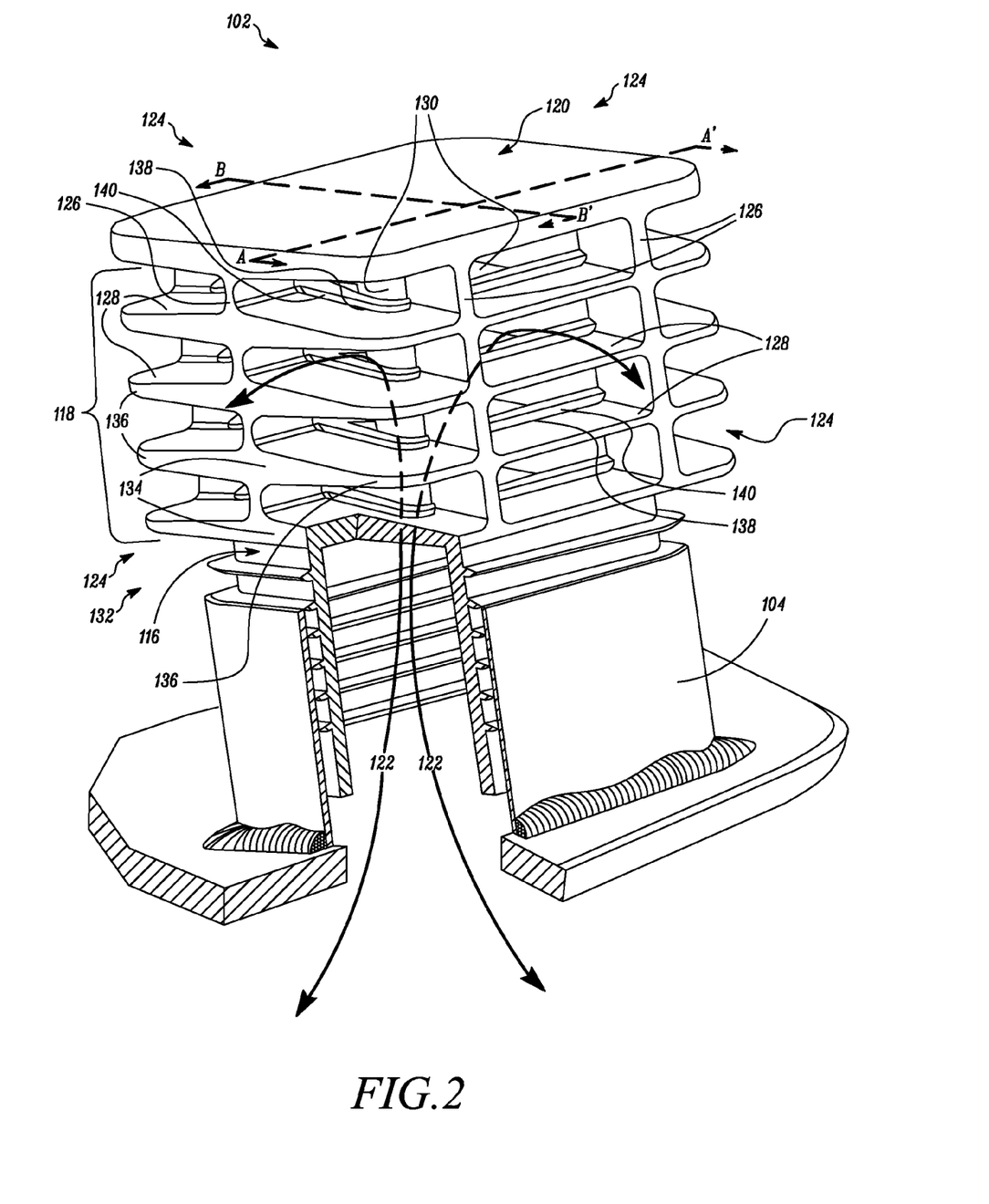
FIG. 2 is a break away perspective view of the ventilation cap with a vent pipe shown in FIG. 1.

As shown in FIG. 2, the ventilation cap 102 may include a tube portion 116, a vent portion 118, and an upper portion 120. The tube portion 116 may be configured to releasably engage with the vent pipe 104. The vent portion 118 may extend from the tube portion 116 to define a common pathway 122 formed therein. The vent portion 118 may include at least three interconnected adjacent sides 124. Each of the sides 124 may include one or more upright ribs 126, and multiple contiguous ribs 128 laterally extending from the upright ribs 126 to define openings 130. The openings 130 defined by the upright and contiguous ribs 128 may fluidly communicate with the pathway 122. In an embodiment, the pathway 122 may fluidly communicate with an atmosphere 114 via the openings 130 of the vent portion 118. Therefore, a person having ordinary skill in the art that may acknowledge that in embodiments disclosed herein, the contiguous ribs 128 and the upright ribs 126 may be sized and shaped to define the openings 130 such that air may be orthogonally directed to the pathway 122 while solid and liquid matter may be prevented from entering the pathway 122.

Further, the contiguous ribs 128 at one of the sides 132 may have an intermediate segment 134 with an increased cross-sectional area. Therefore, the contiguous ribs 128 may taper laterally from the intermediate segment 134 to ends 136 of the contiguous ribs 128. In an embodiment as shown in FIG. 2, each of the contiguous ribs 128 may include an inner edge 138 defining a parapet 140 extending into the opening 130. The parapet 140 may be configured to restrict the incident solid or liquid matter from falling into the vent pipe 104.

Figure 3:
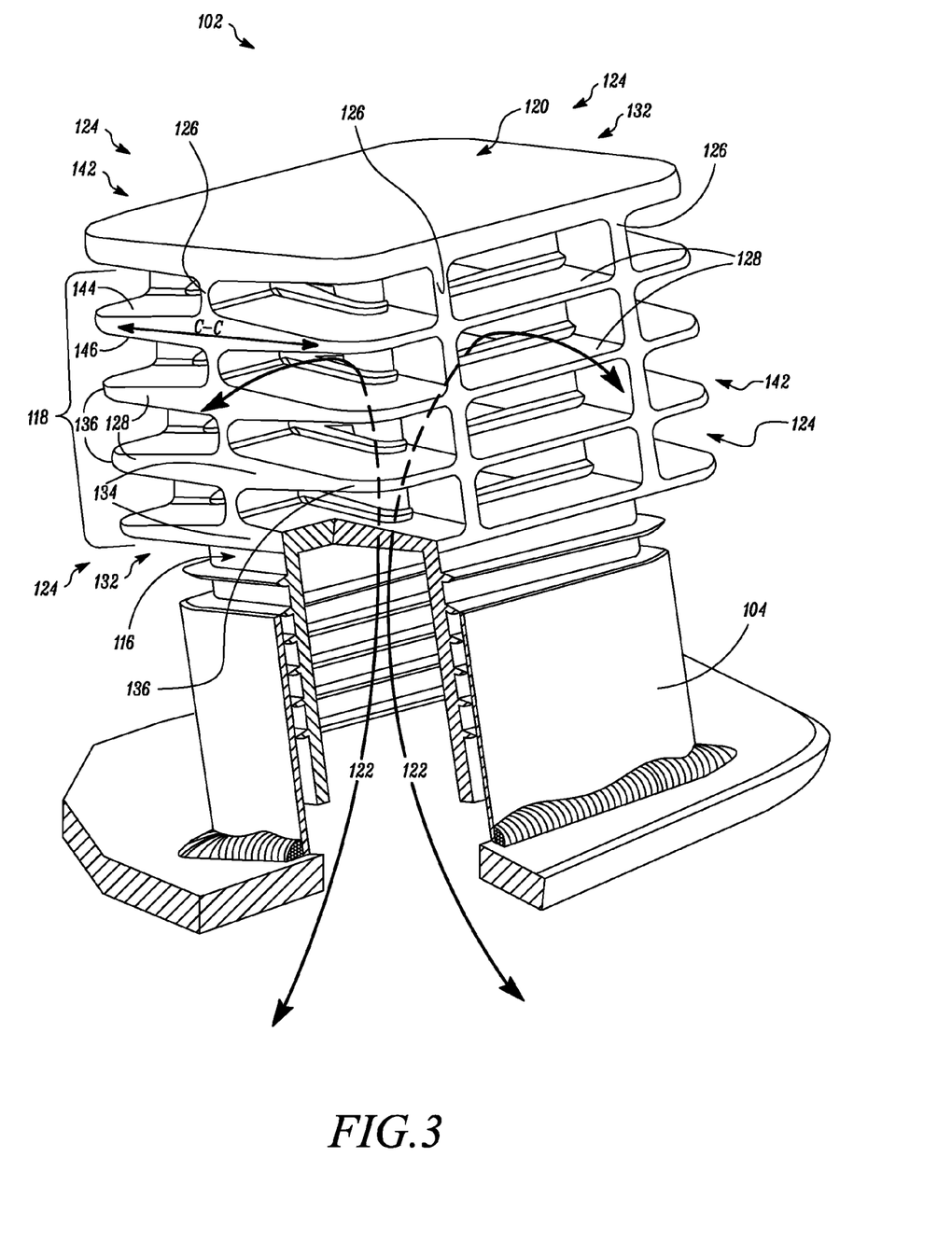
FIG. 3 is a break away perspective view of the ventilation cap and the vent pipe.

In an exemplary embodiment as shown in FIG. 3, the vent portion 118 may include four adjacent sides 124, for example, a pair of opposing first sides 132, and a pair of opposing second sides 142. Each of the first sides 132 may include a single upright rib 126, while each of the second sides 142 may include a pair of upright ribs 126, although each of the sides 132, 142 can include any number of upright ribs 126. The contiguous ribs 128 at the first side 132 may be a dual tapered rib having an increased cross-sectional area at an intermediate segment 134 of the contiguous rib 128. Therefore, the cross-sectional area of the contiguous ribs 128 at the first side 132 may decrease from the intermediate segments 134 to ends 136 of the contiguous rib 128 in a lateral direction C-C. Hence, an upper and lower face 144, 146 of the contiguous ribs 128 of the first side 132 may be oriented to converge towards each other at the ends 136 of the contiguous ribs 128.

Figure 4:
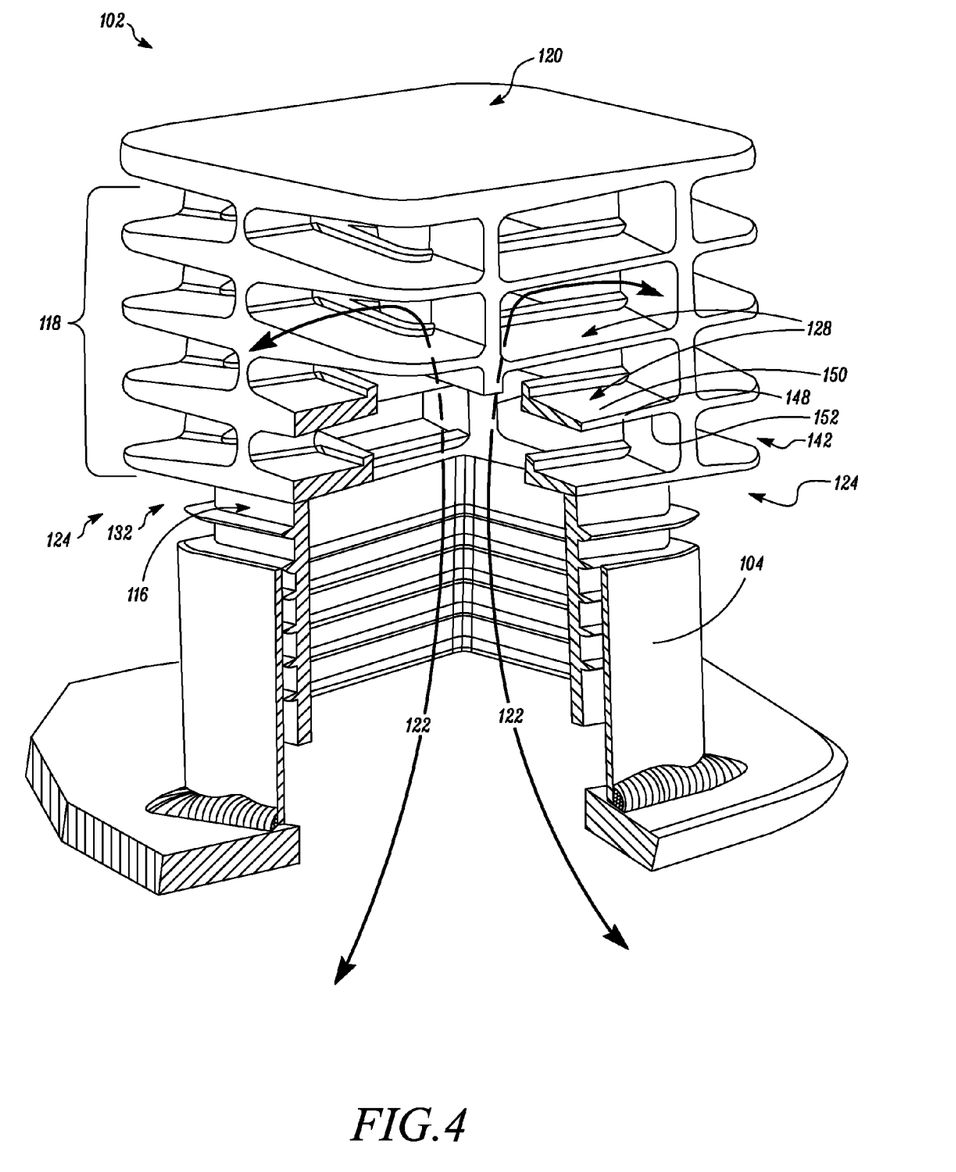
FIG. 4 is a break away perspective view of the ventilation cap and the vent pipe.

In an embodiment as shown in FIG. 4, the contiguous ribs 128 at the second side 142 may be single or dual tapered ribs. In this embodiment, the contiguous ribs 128 at the second side 142 may have a decreasing cross-sectional area from adjacent the pathway 122 towards an outer edge 148. Hence, an upper and lower face 150, 152 of each contiguous rib 128 at the second side 142 may be oriented to converge towards each other at the outer edge 148 in a lateral direction C-C.

In another embodiment, the contiguous ribs 128 at another one of the sides 142 may be inclined contiguous ribs 128 having a uniform cross-sectional area. Therefore, in the embodiment shown in FIG. 5, it can be seen that the contiguous ribs 128 at the second side 142 may be inclined contiguous ribs 128 having a uniform cross-sectional area. The inclined contiguous ribs 128 disclosed herein, may represent contiguous ribs 128 that are angled downwardly with respect to the upright ribs 126. Hence, angled upper and lower faces 144, 146 or 150, 152 exposed by the contiguous ribs 128, in any of the embodiments disclosed herein, may be configured to drain away liquid or solid matter such as, rain or snow, away from the vent pipe 104.

Figure 5:
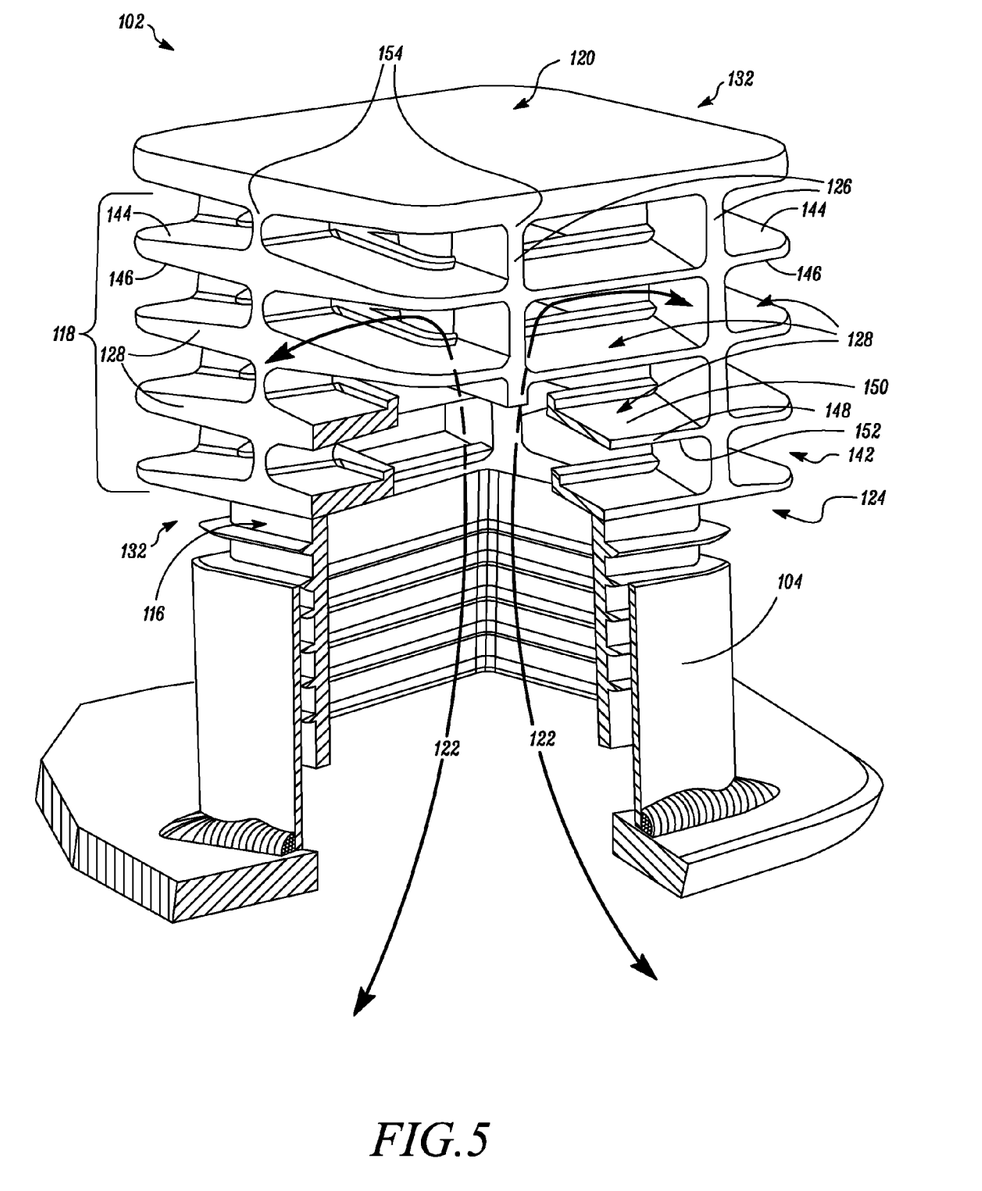
FIG. 5 is a break away perspective view of the ventilation cap and the vent pipe.

In an embodiment as shown in FIG. 5, the upright ribs 126 may extend beyond the multiple contiguous ribs 128. The upper portion 120 may be disposed above the vent portion 118 and may be connected to an upper end 154 of the upright ribs 126. In an embodiment, the upper portion 120 may be disposed parallel to the contiguous ribs 128 of the first side 132 or the second side 142. In a specific embodiment shown in FIG. 5, the upper portion 120 may be disposed parallel to the contiguous ribs 128 of the first side 132. The upper portion 120 may be configured to prevent entry of solid or liquid matter, for example, rain or snow, incident from directly above it into the vent pipe 104.

Figure 6:
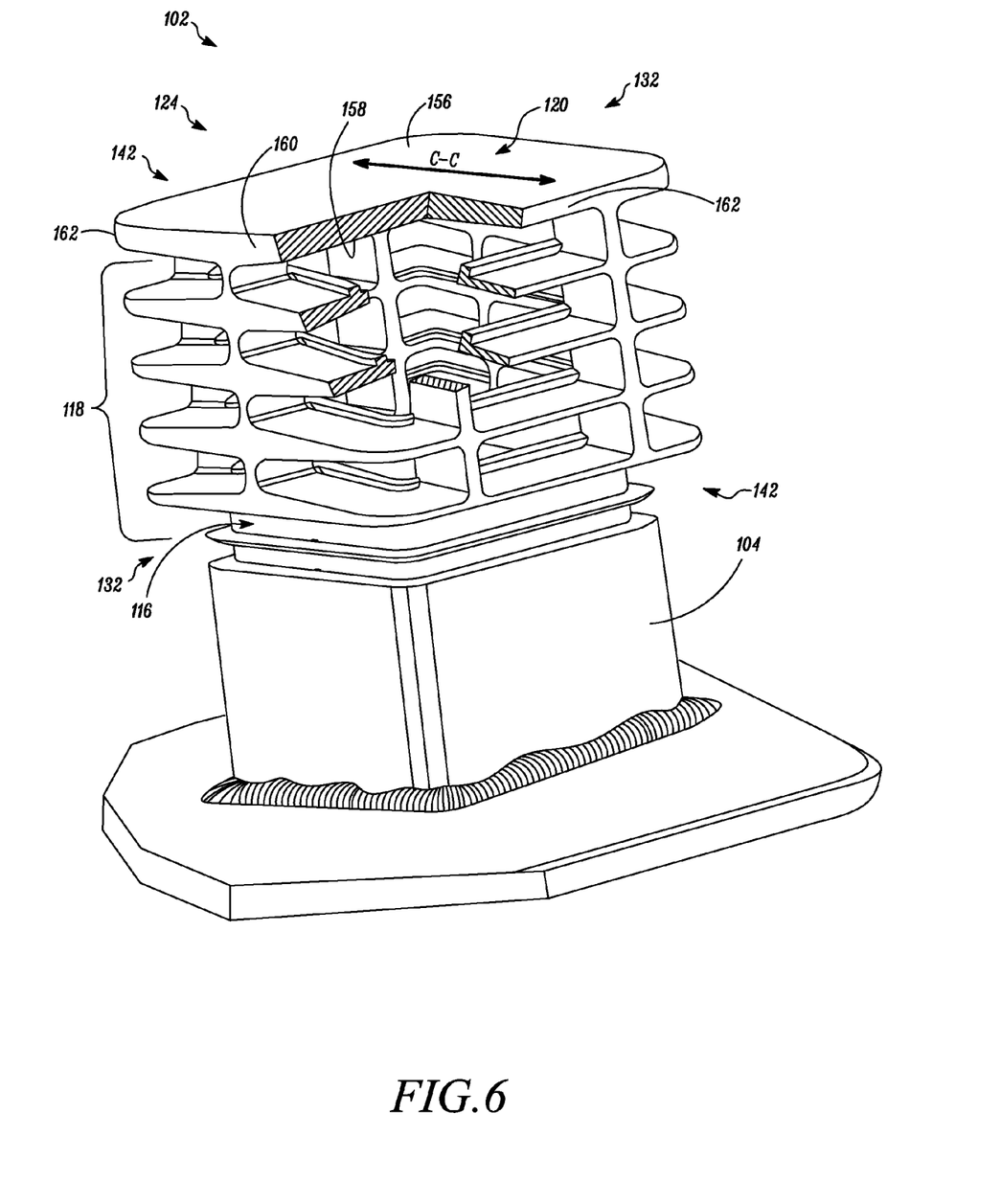
FIG. 6 is a break away perspective view of the ventilation cap and the vent pipe.

As shown in FIG. 6, the upper portion 120 may have a top surface 156 and a bottom surface 158. In an embodiment, the upper portion 120 at the first side 132 may have an increased cross-sectional area at an intermediate segment 160. Therefore, the cross-sectional area of the upper portion 120 may decrease from the intermediate segment 160 to ends 162 of the upper portion 120 in a lateral direction C-C. Furthermore, the cross-sectional area of the upper portion 120 at the second side 142 may increase from the ends 162 towards the pathway 122.

Figure 7:
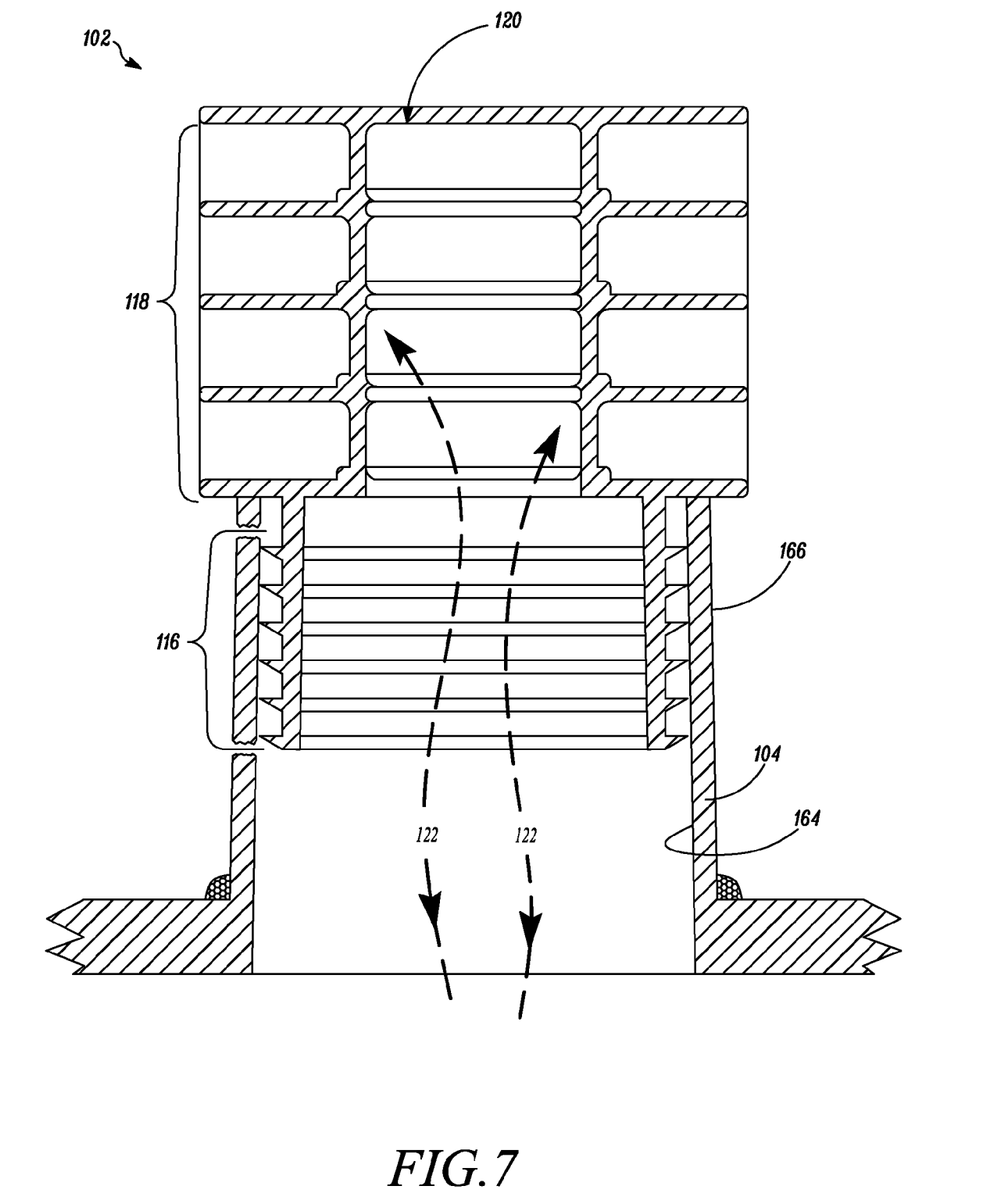
FIG. 7 is a sectional view of the ventilation cap and the vent pipe along section A-A' shown in FIG. 2.
Figure 8:
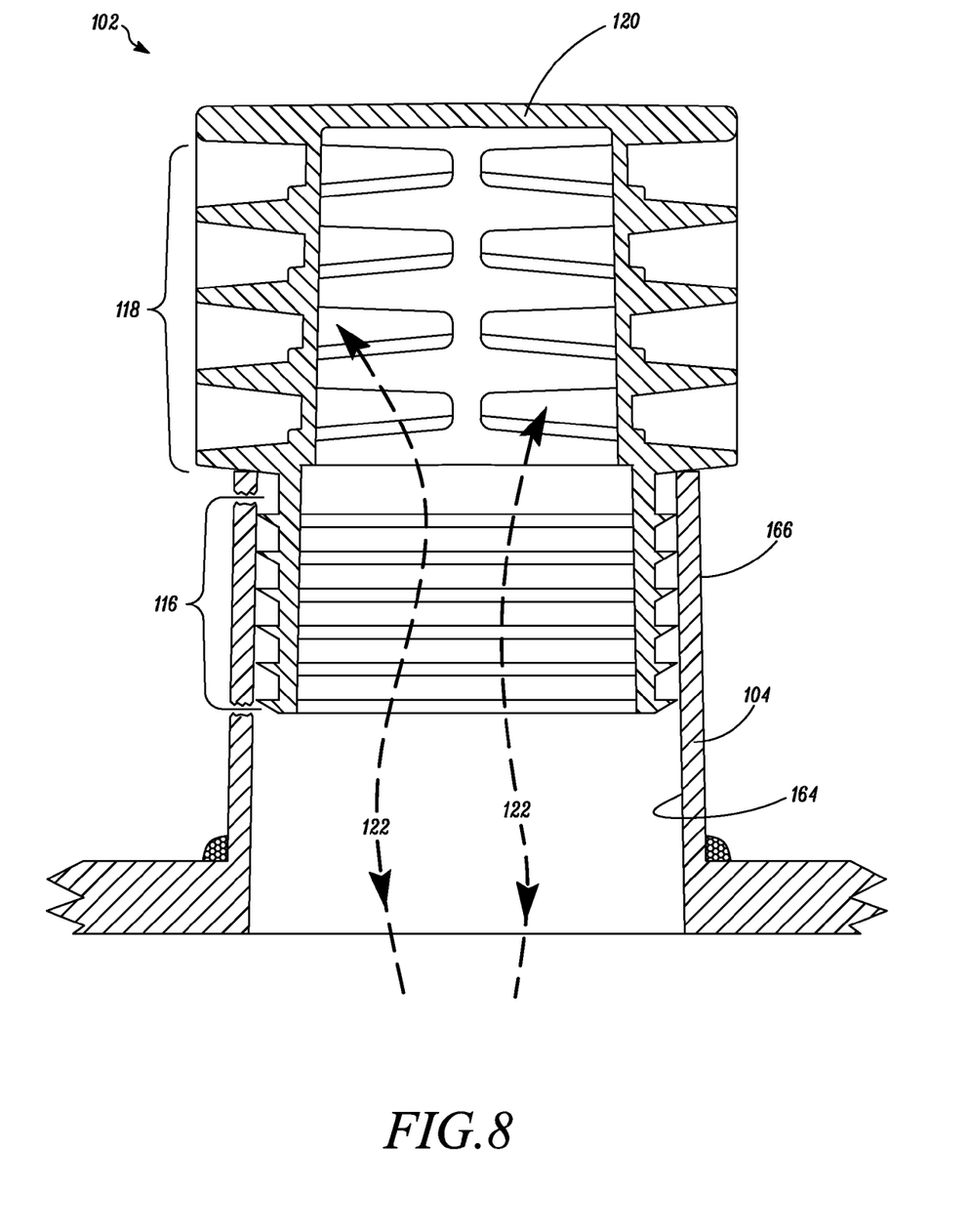
FIG. 8 is a sectional view of the ventilation cap and the vent pipe along section B-B' shown in FIG. 2.

FIGS. 7-8 show a sectional view of the ventilation cap 102 and the vent pipe 104 of FIG. 2 along sections A-A' and B-B' respectively. In an embodiment, the tube portion 116 may be corrugated. In an embodiment as shown in FIGS. 7-8, the corrugated tube portion 116 may be configured to accomplish an interference fit with an inner surface 164 of the vent pipe 104. However, in other embodiments, the corrugated tube portion 116 may be configured to releasably engage the vent pipe 104 by snugly receiving an outer surface 166 of the vent pipe 104.

Figure 9:
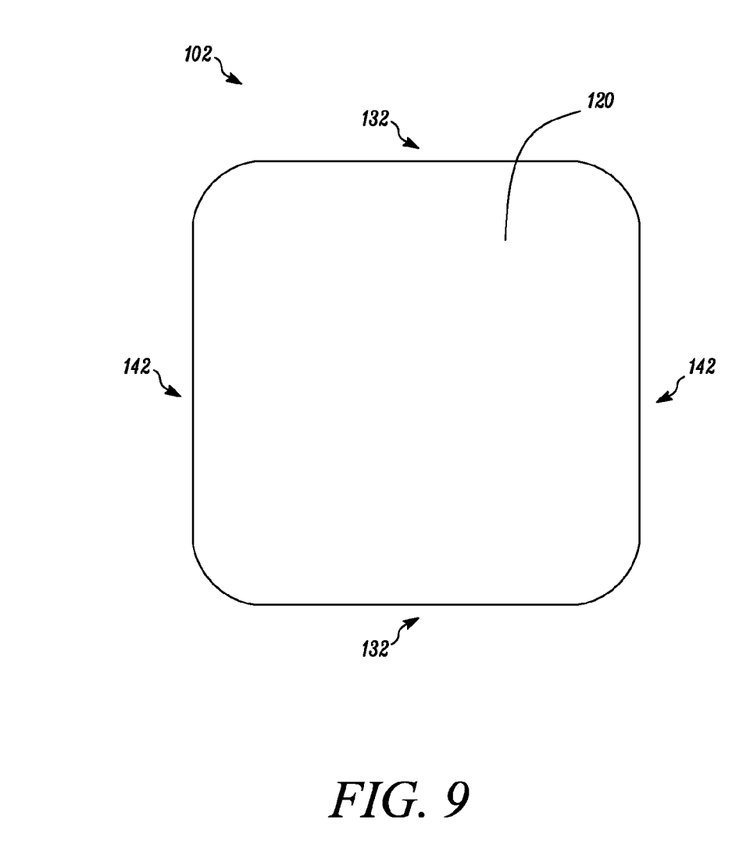
FIG. 9 is a top view of the ventilation cap.
Figure 10:
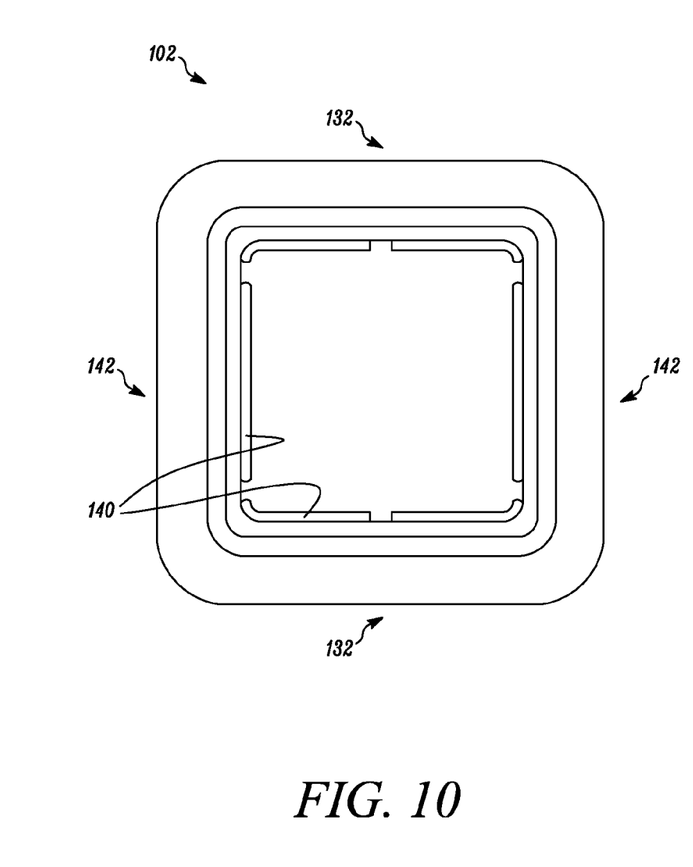
FIG. 10 is a bottom view of the ventilation cap.

FIGS. 9-10 illustrate a top and bottom view of the ventilation cap 102 respectively.

INDUSTRIAL APPLICABILITY

Conventional vent covers are typically manufactured by assembling separate components that make up the vent cover. Subsequently, the manufacturing processes involved for the separate components therein may be distinct from each other and hence, this may entail different process lines in an industrial facility.

Typically, the vent covers mounted on a vent pipe 104 of a machine, allow an exchange of gases between the machine and the atmosphere 114. These vent covers may include multiple openings to allow exchange of gases. However, these openings may be disposed facing substantially upward into the atmosphere 114. Hence, during rainy or snowy conditions, use of the vent cover may inadvertently allow liquid or solid matter such as water or ice into the pipe. Subsequently, the machine may be negatively impacted.

Further, some of the conventional vent covers may additionally include a filter element disposed in the flow path to trap the solid or liquid matter and selectively allow a gaseous exchange between the associated machine and the atmosphere 114. Although the aforesaid arrangement may help mitigate the consequences of solid or liquid matter entering the machine, the filter element may get clogged over time and may need replacement incurring additional costs. A person having ordinary skill in the art will acknowledge that the clogged filters, when used in ventilating systems 110 or HVAC systems of machines, may result in a decrease in efficiency of such systems. Further, down times of the machine may be experienced during replacement or servicing of such clogged filter elements.

The ventilation cap 102, disclosed herein, may be easy to manufacture in that, it may be manufactured by a single step process such as injection molding. Further, materials used in this process are generally thermoplastic elastomers that impart favorable properties to the ventilation cap 102. Favorable properties, disclosed herein, may include high resistance to thermal loads, anti-rust property, light weight, elasticity, plasticity, washability and the like.

Further, the ventilation cap 102 is configured to be mounted to the vent pipe 104 of the automobile 100 in a substantially upright position thereby allowing the upper portion 120 to prevent entry of solid or liquid matter into the vent pipe 104. However, the pathway 122 may allow gases to enter and exit the vent pipe 104. While it may not be readily obvious, the positioning of the ventilation cap 102 in a substantially upright position and the relative positions of the upright and contiguous ribs 126, 128, and the upper portion 120 with respect to the vent pipe 104 may allow gases to enter and exit the vent pipe 104 while solid or liquid matter may be prevented from entering the vent pipe 104.

Further, the ventilation cap 102 disclosed herein is releasably engaged to the vent pipe 104, thereby making assembly onto the machine or automobile 100 easy. Furthermore, service of the ventilation cap 102 may be accomplished by disengaging the vent cap from the machine and using commonly known processes in the art such as wet washing, ultra-violet germicidal irradiation, mechanical scrubbing and the like. In cases of performing a wet-washing process, the ventilation cap 102 may be left to dry before re-engaging it to the vent pipe 104. Therefore, servicing of the ventilation cap 102 may be performed easily.

It is evident from the preceding disclosure that the ventilation cap 102 may be re-used several times before a service life of the ventilation cap 102 expires. Further, the ventilation cap 102 is made from materials that are mostly recyclable. A person having ordinary skill in the art may appreciate that this re-use and recyclability characteristics of the ventilation cap 102 may produce lesser carbon footprint.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

We claim:

1. A ventilation cap comprising:
   a tube portion configured to releasably engage with a vent pipe;
   a vent portion extending from the tube portion to define a common pathway formed therein, the vent portion including at least three interconnected adjacent sides, each of the sides including:
   one or more upright ribs; and
   a plurality of contiguous ribs laterally extending from the upright ribs to define openings in fluid communication with the common pathway, the contiguous ribs at one or more sides having an intermediate segment with an increased cross-sectional area, and tapering laterally from the intermediate segment to ends; and
   an upper portion disposed above the vent portion and connected to an upper end of the upright ribs.

2. The ventilation cap of claim 1, wherein the upright ribs extend beyond the plurality of contiguous ribs.

3. The ventilation cap of claim 1, wherein the upper portion is disposed parallel to each of the contiguous ribs.

4. The ventilation cap of claim 1, wherein the contiguous ribs at another one of the sides are inclined contiguous ribs having a uniform cross-sectional area.

5. The ventilation cap of claim 1, wherein an inner edge of each of the contiguous ribs extends into the opening and includes a parapet.

6. The ventilation cap of claim 1, wherein the common pathway fluidly communicates with an atmosphere via the openings of the vent portion.

7. The ventilation cap of claim 1, wherein the ventilation cap is made of a thermoplastic elastomer.

8. The ventilation cap of claim 1, wherein the tube portion is corrugated.

9. The ventilation cap of claim 1, wherein the tube portion is configured to releasably engage with an inner surface of the vent pipe.

10. The ventilation cap of claim 1, wherein the tube portion is configured to releasably engage with an outer surface of the vent pipe.

11. A ventilation cap comprising:
    a tube portion configured to releasably engage with a vent pipe;
    a vent portion extending from the tube portion to define a common pathway formed therein, the vent portion including at least three interconnected adjacent sides, each of the sides including:
    one or more upright ribs; and
    a plurality of contiguous ribs laterally extending from the upright ribs to define openings in fluid communication with the common pathway, the contiguous ribs at one or more sides having an intermediate segment with an increased cross-sectional area, and tapering laterally from the intermediate segment to ends, the contiguous ribs further having an inner edge defining a parapet; and
    an upper portion disposed above the vent portion and connected to an upper end of the upright ribs.

12. The ventilation cap of claim 11, wherein the upright ribs extend beyond the plurality of contiguous ribs.

13. The ventilation cap of claim 11, wherein the upper portion is disposed parallel to each of the contiguous ribs.

14. The ventilation cap of claim 11, wherein the contiguous ribs at another one of the sides are inclined contiguous ribs having a uniform cross-sectional area.

15. The ventilation cap of claim 1, wherein the parapet extends into the opening.

16. The ventilation cap of claim 11, wherein the common pathway fluidly communicates with an atmosphere via the openings.

17. The ventilation cap of claim 11, wherein the ventilation cap is made of a thermoplastic elastomer.

18. The ventilation cap of claim 11, wherein the tube portion is corrugated.

19. The ventilation cap of claim 11, wherein the tube portion is configured to releasably engage with an inner surface of the vent pipe.

20. The ventilation cap of claim 11, wherein the tube portion is configured to releasably engage with an outer surface of the vent pipe.

* * * * *